(12) United States Patent
Minami et al.

(10) Patent No.: US 9,126,384 B2
(45) Date of Patent: Sep. 8, 2015

(54) BONDED BODY OF CERAMIC MEMBER AND METAL MEMBER AND METHOD FOR MANUFACTURING THE SAME

(71) Applicant: NGK INSULATORS, LTD., Nagoya (JP)

(72) Inventors: Tomoyuki Minami, Handa (JP); Tetsuya Kawajiri, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/070,862

(22) Filed: Nov. 4, 2013

(65) Prior Publication Data

US 2014/0127484 A1    May 8, 2014

Related U.S. Application Data

(60) Provisional application No. 61/722,907, filed on Nov. 6, 2012.

(51) Int. Cl.
*B21D 39/00* (2006.01)
*B32B 5/18* (2006.01)
*B32B 7/04* (2006.01)
*B23K 1/008* (2006.01)
*B23K 1/19* (2006.01)

(52) U.S. Cl.
CPC .............. *B32B 7/045* (2013.01); *B23K 1/008* (2013.01); *B23K 1/19* (2013.01); *Y10T 428/24917* (2015.01)

(58) Field of Classification Search
None
See application file for complete search history.

(56) References Cited

U.S. PATENT DOCUMENTS

| | | | | |
|---|---|---|---|---|
| 3,140,536 | A * | 7/1964 | Kuznetzoff | 228/123.1 |
| 4,444,719 | A * | 4/1984 | Sakakibara et al. | 420/511 |
| 6,071,592 | A * | 6/2000 | Sakuraba et al. | 428/141 |
| 6,291,804 | B1 * | 9/2001 | Fujii | 219/541 |
| 6,436,545 | B1 | 8/2002 | Tanahashi et al. | |
| 6,918,530 | B2 * | 7/2005 | Shinkai et al. | 228/122.1 |
| 7,663,242 | B2 * | 2/2010 | Lewis et al. | 257/772 |
| 2002/0139563 | A1 * | 10/2002 | Fujii et al. | 174/117 A |
| 2012/0250211 | A1 * | 10/2012 | Kida et al. | 361/234 |

FOREIGN PATENT DOCUMENTS

JP    2000-219578 A1    8/2000

* cited by examiner

*Primary Examiner* — Humera Sheikh
*Assistant Examiner* — Seth Dumbris
(74) *Attorney, Agent, or Firm* — Burr & Brown, PLLC

(57) ABSTRACT

A bonded body 10 includes a plate-shaped alumina or aluminum nitride ceramic member 12 and a Mo or Ti terminal 14 having a Ni coating, a Au coating, or a Ni—Au coating (Au on Ni) and joined to a recess 12a in the ceramic member 12 with a joint layer 16 therebetween. The joint layer 16 contains Au, Ge, Ag, Cu, and Ti and is in contact with at least part of the side surfaces (herein the entire side surfaces) and the bottom surface of the recess 12a. Ti is rich in the joint interface between the joint layer 16 and the ceramic member 12. The percentage (porosity) of the sum of the cross-sectional areas of pores to the cross-sectional area of the joint layer 16 in a cross-section taken across the thickness of the bonded body 10 is 0.1% to 15%.

5 Claims, 2 Drawing Sheets

BONDED BODY OF CERAMIC MEMBER AND METAL MEMBER AND METHOD FOR MANUFACTURING THE SAME

BACKGROUND OF THE INVENTION

1. Technical Field

The present invention relates to bonded bodies of a ceramic member and a metal member and methods for manufacturing such bonded bodies.

2. Description of Related Art

Bonded bodies of a ceramic member and a metal member are known, among which is a bonded body of an end of a metal member and a ceramic member joined with a joint (see Patent Literature 1). The joint of the bonded body includes a metallized layer formed on the ceramic member and a brazing layer disposed between the metallized layer and the end of the metal member. This bonded body is manufactured as follows. Specifically, a ring-shaped first brazing material containing Cu—Al—Si—Ti is first placed on a joining surface of a disc-shaped ceramic member made of sintered AlN. The first brazing material is heated at 1,050° C. in a vacuum atmosphere for 5 minutes to form a metallized layer. A ring-shaped second brazing material containing Ag—Cu is then placed on the metallized layer, and an end surface of a cylindrical metal member is placed thereon, with a weight placed on the metal member. It is heated at 800° C. in a vacuum atmosphere for 5 minutes to form a brazing layer. The bonded body thus manufactured has substantially no helium leak and is also not cracked and has substantially no helium leak after thermal cycling.

CITATION LIST

Patent Literature

[PTL 1] Japanese Unexamined Patent Application Publication No. 2000-219578

SUMMARY OF INVENTION

Technical Problem

However, such a bonded body may have insufficient strength.

A primary object of the present invention, which has been made to solve the foregoing problem, is to sufficiently increase the strength of a bonded body of a metal member and a ceramic member joined together.

Solution to Problem

A bonded body according to the present invention comprises an alumina or aluminum nitride ceramic member and a metal member comprising Mo or Ti and having a Ni coating, a Au coating, or a Ni—Au coating (Au on Ni), the metal member being joined to a recess in the ceramic member with a joint layer therebetween, wherein the joint layer contains Au, Ge, Ag, Cu, and Ti and is in contact with a bottom surface and at least part of a side surface of the recess, Ti is rich in one side of the joint layer, the one side being near a joint interface between the joint layer and the ceramic member, and the percentage (porosity) of the sum of the cross-sectional areas of pores to the cross-sectional area of the joint layer in a cross-section taken across the thickness of the bonded body is 0.1% to 15%.

This bonded body has sufficiently high strength as a bonded body of a ceramic member and a metal member joined together. Possible reasons are as follows. First, the joint layer, which contains Au, Ge, Ag, Cu, and Ti, is probably suitable for joining together the alumina or aluminum nitride ceramic member and the metal member made of Mo or Ti and having a Ni coating, a Au coating, or a Ni—Au coating (Au on Ni). Second, because Ti is rich in one side of the joint layer, the one side being near the joint interface between the joint layer and the ceramic member, it probably reacts with the ceramic in the joint interface and thus functions to securely join the joint layer. Third, a porosity of 0.1% to 15% provides high strength and prevents cracking both initially and after thermal cycling. A porosity of less than 0.1% is undesirable because the bonded body would be cracked and have a significantly lower strength after thermal cycling than initially. A porosity of more than 15% is undesirable because it would result in extremely decreased strength.

Ti is preferably aggregated around the pores present in the joint layer of the bonded body according to the present invention. Such aggregated Ti can be determined from a Ti mapping image of a cross-section taken across the thickness of the bonded body.

A method for manufacturing a bonded body according to the present invention, comprising the steps of:

(a) providing an alumina or aluminum nitride ceramic member having a recess;

(b) applying a Ag—Cu—Ti paste to a bottom surface and at least part of a side surface of the recess and heating the paste to 800° C. to 900° C. in a vacuum atmosphere to form a metallized layer on the bottom surface and at least part of the side surface of the recess; and (c) setting a Au—Ge sheet on the bottom surface of the recess on which the metallized layer is formed, setting thereon a metal member comprising No or Ti and having a Ni coating, a Au coating, or a Ni—Au coating (Au on Ni), and heating the components to 360° C. to 450° C. in a vacuum atmosphere to form a joint layer in which the metallized layer and the Au—Ge sheet are combined together between the metal member and the ceramic member.

This method for manufacturing a bonded body provides a bonded body with sufficiently high strength. In addition, this method for manufacturing a bonded body is suitable for manufacturing the bonded body described above.

In the method for manufacturing a bonded body according to the present invention, the metallized layer is preferably formed with a thickness of 5 to 75 μm in step (b). This further increases the strength of the bonded body and also prevents cracking of the ceramic member.

In the method for manufacturing a bonded body according to the present invention, the Ag—Cu—Ti paste used in step (b) preferably contains 1.50% to 2.10% by weight of Ti. If the Ti content falls below the lower limit, the resulting bonded body would have a significantly lower strength after thermal cycling than initially and would be cracked after thermal cycling. If the Ti content exceeds the upper limit, the resulting bonded body would have low strength both initially and after thermal cycling (although no cracking occurs).

DETAILED DESCRIPTION OF THE INVENTION

A preferred embodiment of the present invention will now be described with reference to the drawings. FIGS. 1A-1D show illustrations of a process for manufacturing a bonded body 10 according to this embodiment.

Figure 1A:
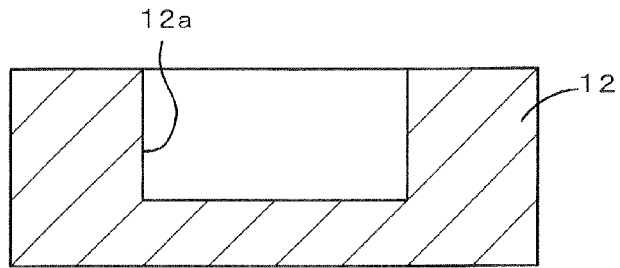
FIGS. 1A-1D show illustrations of a process for manufacturing a bonded body 10.
Figure 1B:
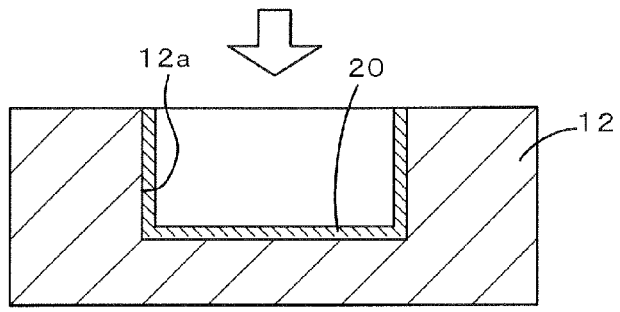
Figure 1C:
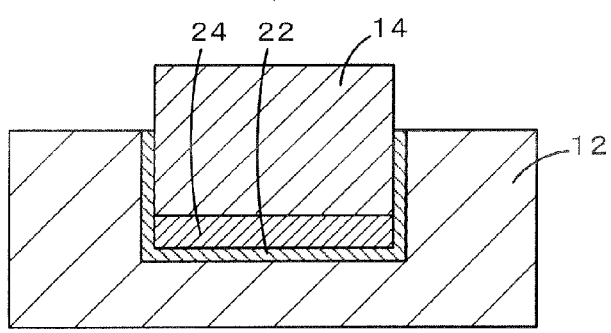
Figure 1D:
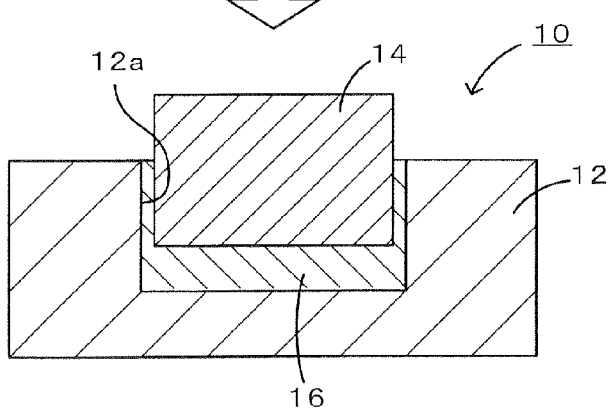

As shown in FIG. 1D, the bonded body 10 according to this embodiment includes a plate-shaped alumina or aluminum nitride ceramic member 12 and a Mo or Ti terminal 14 having a Ni coating, a Au coating, or a Ni—Au coating (Au on Ni) and joined to a recess 12a in the ceramic member 12 with a joint layer 16 therebetween. The joint layer 16 contains Au, Ge, Ag, Cu, and Ti and is in contact with at least part of the side surfaces (herein the entire side surfaces) and the bottom surface of the recess 12a. Ti is rich in one side of the joint layer 16, the one side being near the joint interface between the joint layer 16 and the ceramic member 12. The percentage (porosity) of the sum of the cross-sectional areas of pores to the cross-sectional area of the joint layer 16 in a cross-section taken across the thickness of the bonded body 10 is 0.1% to 15%.

The pores can determined as dark areas by binarization of the cross-section of the joint layer 16. Binarization can be performed, for example, by generating a luminance histogram of the pixels in the entire cross-section of the joint layer 16, setting the luminance at a point (valley) between two peaks in the histogram as a threshold, and assigning 0 to pixels with luminances below the threshold and 255 to pixels with luminances at or above the threshold. In the Examples described later, the porosity was calculated by binarization with the luminance threshold set to 80.

The bonded body 10 can be manufactured, for example, as follows. The ceramic member 12 having the recess 12a is first provided (see FIG. 1A). A Ag—Cu—Ti paste 20 is then applied to the bottom surface and at least part of the side surfaces of the recess 12a. After application is complete, the paste is dried and is baked by heating to 800° C. to 900° C. in a vacuum atmosphere (see FIG. 1B). As a result, a metallized layer 22 is formed on the bottom surface and at least part of the side surfaces of the recess 12a. A baking temperature of lower than 800° C. is undesirable because the paste material would exhibit poor reactivity, whereas a baking temperature of higher than 900° C. is undesirable because more reaction product would form, which results in an increased residual stress due to an increased difference in thermal expansion and an increased Young's modulus and thus contributes to cracking and decreased strength. A Au—Ge sheet 24 is then set on the bottom surface of the recess 12a on which the metallized layer 22 is formed (see FIG. 1C). The terminal 14 is placed on the Au—Ge sheet 24, and a weight (not shown) is placed on the terminal 14. It is heated to 360° C. to 450° C. in a vacuum atmosphere. Thus, a joint layer 16 in which the metallized layer 22 and the Au—Ge sheet 24 are combined together is formed between the terminal 14 and the ceramic member 12. As a result, the bonded body 10 is produced (see FIG. 1D). A heating temperature of lower than 360° C. is undesirable because the brazing material (Au—Ge sheet) would exhibit poor reactivity, whereas a baking temperature of higher than 450° C. is undesirable because more reaction product would form, which results in an increased residual stress due to an increased difference in thermal expansion and an increased Young's modulus and thus contributes to cracking and decreased strength.

The bonded body 10 described above has sufficiently high strength as a bonded body of a ceramic member and a metal member joined together. Possible reasons are as follows. First, the joint layer 16, which contains Au, Ge, Ag, Cu, and Ti, is probably suitable for joining together the ceramic member 12 and the terminal 14. Second, because Ti is rich in one side of the joint layer, the one side being near the joint interface between the joint layer 16 and the ceramic member 12, it probably reacts with the ceramic in the joint interface and thus functions to securely join the joint layer 16 to the ceramic member 12. Third, a porosity of 0.1% to 15% provides high strength and prevents cracking both initially and after thermal cycling.

The present invention is not limited to the embodiment described above; it is understood that the present invention may be implemented in various embodiments within the technical scope of the present invention.

For example, the ceramic member 12 used in the embodiment described above may have an electrode embedded therein and a conductive member connected to the electrode and exposed in the bottom surface of the recess 12a, and the terminal 14 may be joined to the conductive member with the joint layer 16 therebetween. In this case, the terminal 14 is used to supply current to the electrode. Examples of electrodes include heater electrodes (resistance heaters), electrodes for electrostatic chuck, and electrodes for generating plasma.

EXAMPLES

[Representative Example]

An alumina ceramic member having a recess (terminal hole) with a diameter of 6 mm and a depth of 0.5 mm was provided. The portion of the alumina ceramic member around the recess was masked with masking tape, and a Ag—Cu—Ti paste was applied to the side and bottom surfaces of the recess by a dispenser. After application was complete, the alumina ceramic member was left standing for 10 minutes and was then dried at 120° C. (component temperature) in a clean oven for 1 hour. After the masking tape was removed, the coating was baked at a baking temperature of 850° C. and a degree of vacuum of $5\times10^{-5}$ Torr or less for a baking time of 10 minutes. Thus, a Ag—Cu—Ti metallized layer was formed on the side and bottom surfaces of the recess. The metallized layer had a thickness of 30 μm. The Ag—Cu—Ti paste had a Ti content of 1.7% by weight.

An Au—Ge sheet with a diameter of 5.5 mm and a thickness of 0.15 mm was then set on the bottom surface of the recess. A No terminal having a Ni coating (with a diameter of 5.8 mm and a thickness of 6 mm) was set on the Au—Ge sheet, and a weight is placed thereon, followed by horizontal positioning and alignment. It was then treated at a baking temperature of 400° C. and a degree of vacuum of $5\times10^{-5}$ Torr or less for a baking time of 10 minutes. Thus, a bonded body was fabricated that had a joint layer in which the metallized layer and the Au—Ge sheet were combined together between the terminal and the alumina ceramic member. The joint layer was in contact with the side and bottom surfaces of the recess.

Figure 2:
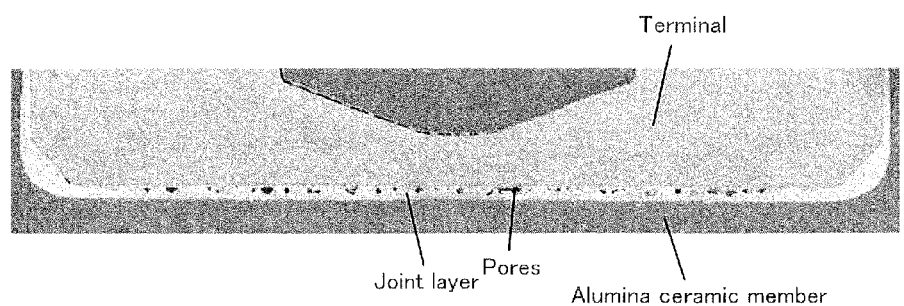
FIG. 2 shows a photograph of a cross-section taken across the thickness of a bonded body of a representative example.

Elemental analysis of the joint layer by EPMA showed that it contained Au, Ge, Ag, Cu, and Ti. In addition, Ti was rich in one side of the joint layer, the one side being near the joint interface between the joint layer and the alumina ceramic member. Specifically, a Ti mapping image of a cross-section taken across the thickness of the bonded body showed a Ti layer in the interface between the alumina ceramic member and the joint layer and aggregated Ti around pores. The Ti layer in the interface between the alumina ceramic member and the joint layer resulted from a reaction of Ti with alumina and probably functioned to join the alumina ceramic member to the joint layer. Furthermore, the joint layer contained small pores and had a porosity of 5.3%. The porosity was calculated as the percentage of the sum of the cross-sectional areas of the pores to the cross-sectional area of the joint layer, where the cross-sections of the pores were determined as dark areas by binarization of the cross-section of the joint layer. FIG. 2 shows a photograph of the cross-section of the joint layer. Binarization was performed using HALCON 11.0 (HALCON is a registered trademark of MVTec Software GmbH).

[Thickness of Metallized Layer]

Bonded bodies were fabricated as in the representative example described above such that the thickness of the metallized layer formed in the recess was as shown in Table 1. The bonded bodies thus fabricated were examined for breaking strength and were also inspected for cracks in the alumina ceramic member immediately after joining. The results are shown in Table 1. The breaking strength, which is synonymous with tensile breaking load, was determined by securely fixing the bonded body to a support with the alumina ceramic member facing downward so that the bonded body did not move up and down, screwing an end of a drawbar into a threaded hole extending downward perpendicular to the top surface of the terminal, applying a perpendicular upward load to the drawbar, and measuring the load when the joint layer broke.

Table 1 uses the following scale of cracking: Good means that no cracking occurred, Fair means that slight cracking occurred but did not affect the joint properties, and Poor means that cracking occurred and critically affected the joint properties.

TABLE 1

| Thickness of metallized layer (μm) | Breaking strength (kgf) | Cracking |
| --- | --- | --- |
| 0 | 0 | — |
| 2 | 50 | ◯ |
| 3 | 83 | ◯ |
| 5 | 131 | ◯ |
| 10 | 143 | ◯ |
| 30 | 152 | ◯ |
| 50 | 148 | ◯ |
| 75 | 142 | ◯ |
| 80 | 105 | ◯ |

As can be seen from Table 1, the bonded bodies in which a metallized layer with a thickness of 2 to 80 μm was formed in the recess had breaking strengths of higher than 50 kgf and were not cracked. In particular, the bonded bodies in which a metallized layer with a thickness of 5 to 75 μm was formed had higher breaking strengths (i.e., higher than 120 kgf). When a metallized layer was formed only on the bottom surface using a Au—Cu—Ti sheet, rather than by applying a Ag—Cu—Ti paste, in the representative example described above, the bonded body was cracked even though the metallized layer had a thickness of 25 μm. This demonstrates that the metallized layer needs to be formed not only on the bottom surface of the recess, but also on at least part of the side surfaces of the recess. It was also demonstrated that a bonded body in which a metallized layer with a thickness of 2 to 80 μm, preferably 5 to 75 μm, is formed has high breaking strength and is not cracked. If the metallized layer has a thickness of less than 2 μm, the bonded body would have low strength because of the insufficient amount of metallized layer formed on the alumina ceramic member; if the metallized layer has a thickness of more than 80 μm, the bonded body would be cracked and have low strength. For the bonded bodies in which a metallized layer with a thickness of 2 to 80 μm was formed, Ti was rich in one side of the joint layer, the one side being near the joint interface between the joint layer and the alumina ceramic member.

[Porosity]

Bonded bodies were fabricated as in the representative example described above using Ag—Cu—Ti pastes whose Ti contents were adjusted such that the porosity was as shown in Table 1, i.e., 0% to 35%. The bonded bodies thus fabricated were examined for breaking strength and the presence or absence of cracks immediately after fabrication. The bonded bodies were also examined for breaking strength and the presence or absence of cracks after a thermal cycling test. The thermal cycling test completed 1,000 cycles of heating from room temperature to 200° C. and cooling to room temperature. The results are shown in Table 2.

The example where a paste having a Ti content of 0% was used was tested once. The examples where pastes having Ti contents of 0.5% and 1.5% were used were tested twice. The examples where other pastes were used were tested three times.

Table 2 uses the following scale of cracking: Good means that no cracking occurred, Fair means that slight cracking occurred but did not affect the joint properties, and Poor means that cracking occurred and critically affected the joint properties.

TABLE 2

| Ti in Ag—Cu—Ti paste[X1] (% by weight) | Porosity (%) | Initial properties Strength (kgf) | Cracking | After thermal cycling Strength (kgf) | Cracking |
| --- | --- | --- | --- | --- | --- |
| 0 | — | 0 | — | — | — |
| 0.50 | — | 45 | Poor | — | — |
|  | — | 62 | Poor | — | — |
| 1.00 | 0 | 144 | Good | 83 | Fair |
|  | 0 | 146 | Fair | 106 | Fair |
|  | 0.1 | 158 | Good | 141 | Good |
| 1.50 | 0.1 | 147 | Good | 143 | Good |
|  | 3.8 | 152 | Good | 149 | Good |
| 1.80 | 2.1 | 132 | Good | 141 | Good |
|  | 5.3 | 146 | Good | 146 | Good |
|  | 9.5 | 151 | Good | 152 | Good |
| 2.10 | 5.3 | 121 | Good | 123 | Good |
|  | 10.5 | 132 | Good | 128 | Good |
|  | 14.8 | 138 | Good | 132 | Good |
| 2.50 | 20.1 | 68 | Good | 63 | Good |
|  | 23.7 | 75 | Good | 78 | Good |
|  | 24.6 | 83 | Good | 85 | Good |
| 3.50 | 27.1 | 30 | Good | — | — |
|  | 30.3 | 42 | Good | — | — |
|  | 34.4 | 46 | Good | — | — |

[X1] This paste contains 61.50% to 65.50% by weight of Ag and 22.70% to 26.70% by weight of Cu.

As can be seen from Table 2, the bonded bodies including a joint layer having a porosity of 0.1% to 15% (mainly, the bonded bodies manufactured using Ag—Cu—Ti pastes having Ti contents of 1.50% to 2.10% by weight) had high breaking strengths, i.e., higher than 120 kgf, both initially and after thermal cycling and were not cracked either initially or after thermal cycling. For the bonded bodies including a joint layer having a porosity of 0.1% to 15%, Ti was rich in one side of the joint layer, the one side being near the joint interface between the joint layer and the alumina ceramic member, as in the representative example. It was also demonstrated that the joint layers having porosities of 0.1% to 15% contained Au, Ge, Ag, Cu, and Ti, as in the representative example.

An bonded body was fabricated as in the representative example except that the alumina ceramic member was replaced by an aluminum nitride ceramic member, the Mo terminal having a Ni coating was replaced by a Mo terminal having a Au coating, and a Ag—Cu—Ti paste having a Ti content of 1.8% by weight was used. The metallized layer had a thickness of 30 μm. This bonded body had a joint layer in which the metallized layer and the Au—Ge sheet were combined together between the terminal and the ceramic member. In addition, Ti was rich in one side of the joint layer, the one side being near the joint interface between the joint layer and the ceramic member. The porosity was 4.1%. The bonded body had sufficient strength, i.e., a breaking strength of 147 kgf immediately after fabrication and a breaking strength of 144 kgf after the thermal cycling test. In addition, the bonded body was not cracked either immediately after fabrication or after the thermal cycling test. These results are attributed to the fact that, for the aluminum nitride ceramic, as in the case of the alumina ceramic, Ti was rich in one side of the joint layer, the one side being near the joint interface between the joint layer and the aluminum nitride ceramic member, and the Au coating had as high wettability on the joint layer as the Ni coating.

A bonded body was fabricated as in the representative example except that the No terminal having a Ni coating was replaced by a Ti terminal having a Ni coating, and a Ag—Cu—Ti paste having a Ti content of 1.8% by weight was used. The metallized layer had a thickness of 30 μm. This bonded body had a joint layer in which the metallized layer and the Au—Ge sheet were combined together between the terminal and the ceramic member. In addition, Ti was rich in one side of the joint layer, the one side being near the joint interface between the joint layer and the ceramic member. The porosity was 3.8%. The bonded body had sufficient strength, i.e., a breaking strength of 148 kgf immediately after fabrication and a breaking strength of 146 kgf after the thermal cycling test. In addition, the bonded body was not cracked either immediately after fabrication or after the thermal cycling test.

Reference Signs List

The present application claims priority from U.S. Provisional Application No. 61/722,907 filed on Nov. 6, 2012, the entire contents of which are incorporated herein by reference.

Reference Signs List

10: bonded body, 12: ceramic member, 12a: recess, 14: terminal, 16: joint layer, 20: Ag—Cu—Ti paste, 22: metallized layer, 24: Au—Ge sheet

What is claimed is:

1. A bonded body comprising an alumina or aluminum nitride ceramic member and a metal member comprising Mo or Ti and having a Ni coating, a Au coating, or a Ni—Au coating, the metal member being joined to a recess in the ceramic member with a joint layer therebetween,
    wherein the joint layer contains Au, Ge, Ag, Cu, and Ti and is in contact with a bottom surface and at least part of a side surface of the recess,
    Ti is rich in one side of the joint layer, the one side being near a joint interface between the joint layer and the ceramic member, and
    the percentage of the sum of the cross-sectional areas of pores to the cross-sectional area of the joint layer in a cross-section taken across the thickness of the bonded body is 0.1% to 15%.

2. The bonded body according to claim 1, wherein Ti is aggregated around the pores present in the joint layer.

3. A method for manufacturing a bonded body, comprising the steps of:
    (a) providing an alumina or aluminum nitride ceramic member having a recess;
    (b) applying a Ag—Cu—Ti paste to a bottom surface and at least part of a side surface of the recess and heating the paste to 800° C. to 900° C. in a vacuum atmosphere to form a metallized layer on the bottom surface and at least part of the side surface of the recess; and
    (c) setting a Au—Ge sheet on the bottom surface of the recess on which the metallized layer is formed, setting thereon a metal member comprising Mo or Ti and having a Ni coating, a Au coating, or a Ni—Au coating, and heating the components to 360° C. to 450° C. in a vacuum atmosphere to form a joint layer in which the metallized layer and the Au—Ge sheet are combined together between the metal member and the ceramic member,
    wherein the joint layer contains Au, Ge, Ag, Cu, and Ti and is in contact with a bottom surface and at least part of a side surface of the recess,
    Ti is rich in one side of the joint layer, the one side being near a joint interface between the joint layer and the ceramic member, and
    the percentage of the sum of the cross-sectional areas of pores to the cross-sectional area of the joint layer in a cross-section taken across the thickness of the bonded body is 0.1% to 15%.

4. The method for manufacturing a bonded body according to claim 3, wherein the metallized layer is formed with the thickness of 5 to 75 μm in step (b).

5. The method for manufacturing a bonded body according to claim 3, the Ag—Cu—Ti paste used in step (b) contains 1.50% to 2.10% by weight of Ti.

* * * * *